April 20, 1954   D. W. PETERSON   2,675,761
HYDRAULIC TRANSMISSION PUMP
Filed Jan. 2, 1952   2 Sheets-Sheet 1
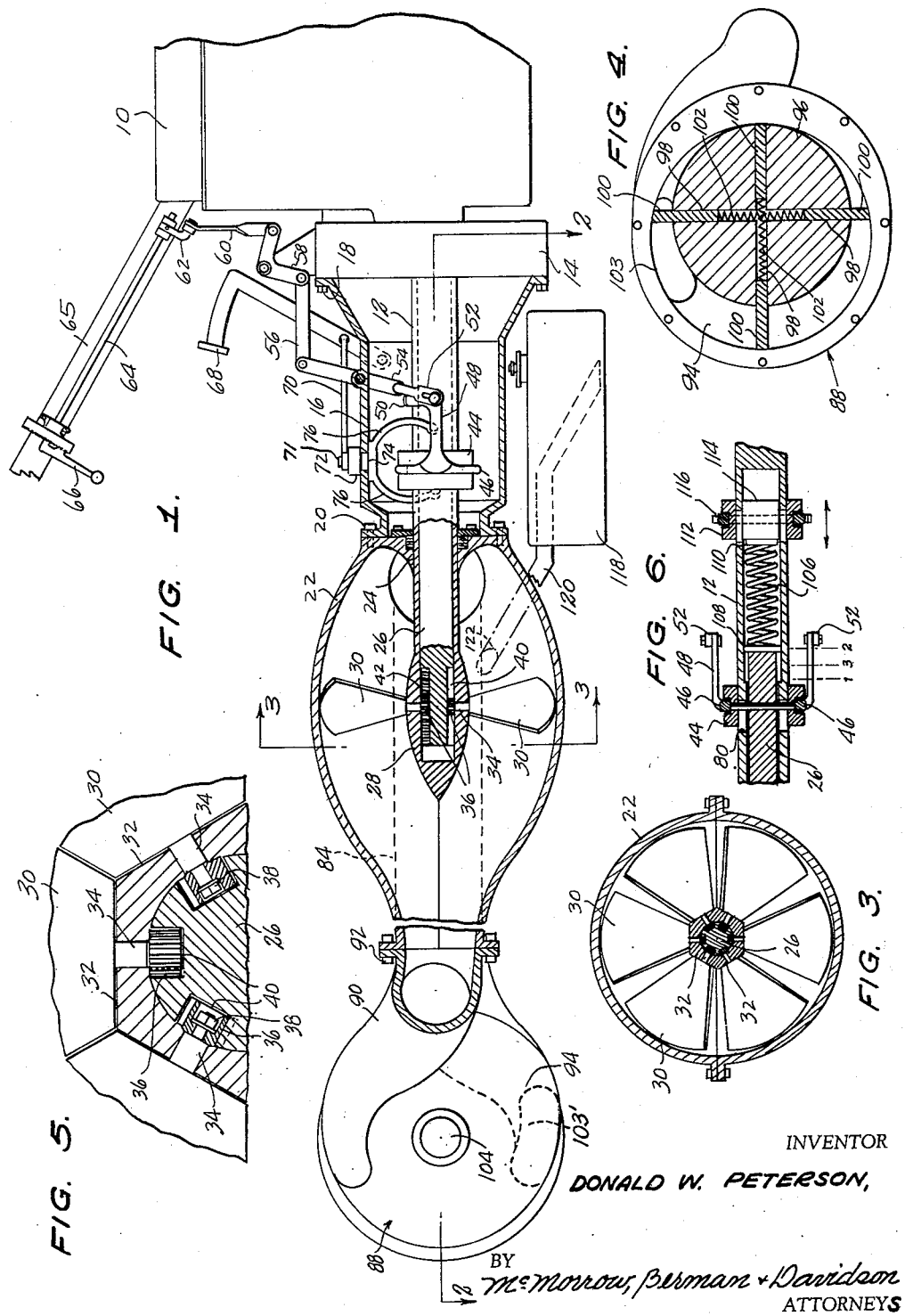
INVENTOR
DONALD W. PETERSON,
BY McMorrow, Berman & Davidson
ATTORNEYS

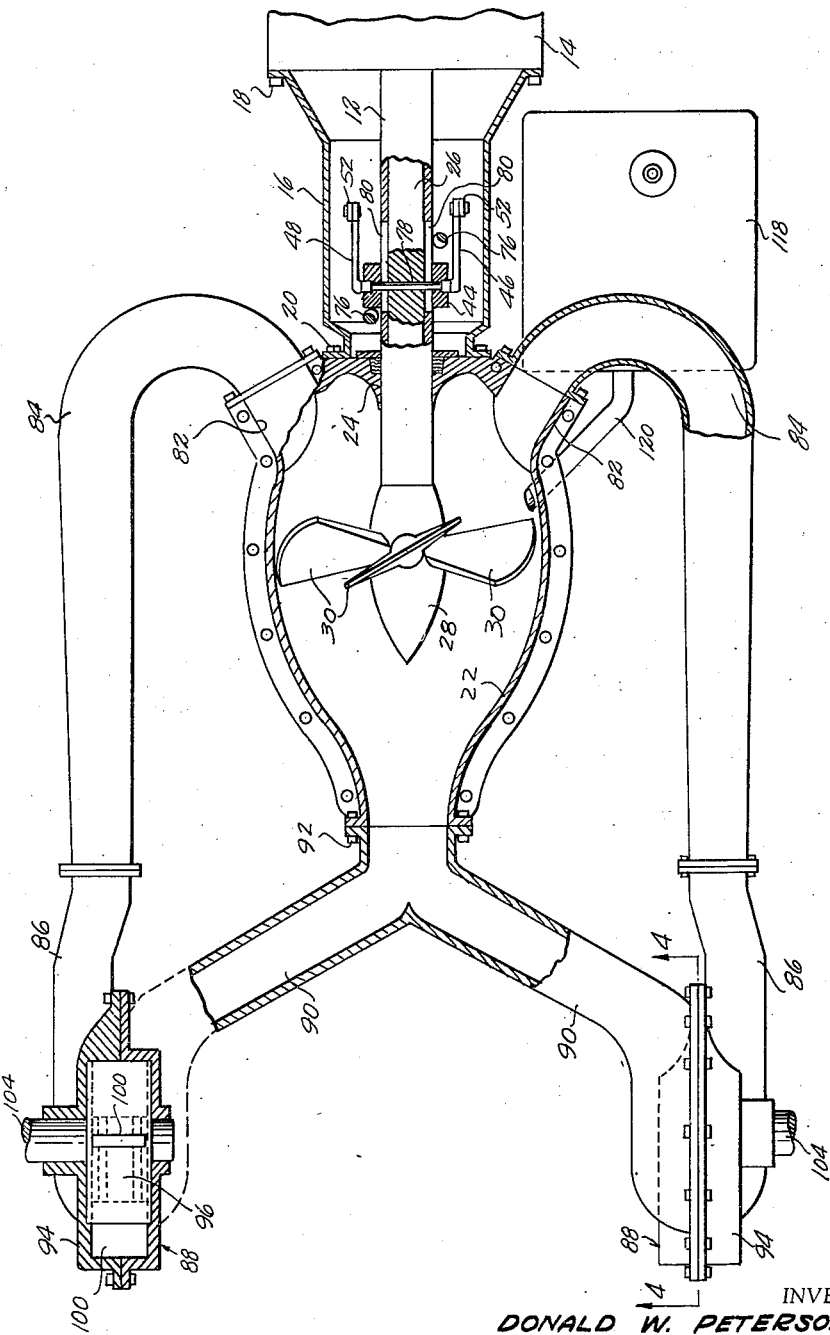

Patented Apr. 20, 1954

2,675,761

UNITED STATES PATENT OFFICE 2,675,761

HYDRAULIC TRANSMISSION PUMP

Donald W. Peterson, Little Rock, Ark.

Application January 2, 1952, Serial No. 264,513

4 Claims. (Cl. 103—89)

This invention relates to a hydraulic transmission, and more particularly, has reference to a transmission of the character described designed mainly for use upon automobiles or other automotive vehicles, but nevertheless adapted for use at any location at which it might be desired to transmit power from a source of motive power to a driven unit under circumstances wherein different speeds or gear ratios might be desired in the transmission of said power.

It is one important object of the present invention to provide an improved hydraulic transmission which will be effective to promote smoother acceleration.

Another important object is to provide a transmission of the character stated wherein the changing of gear ratios will be effected more smoothly than has hitherto been the case.

Another important object is to provide a hydraulic transmission so formed as to obtain any gear ratio from "stop" through "overdrive," rather than the normal three speeds forward allowed by standard transmissions.

Still another important object is to provide a transmission of the type stated which will allow very low speeds without affecting adversely the smooth operation of the engine, and which will eliminate or reduce substantially jerky movements of the vehicle during the starting thereof.

A still further important object is to provide a transmission as stated which is so designed as to permit its being used either as an automatic or as a manually shifted transmission, with only small changes being necessary to effect the conversion.

A still further object is to provide an arrangement, in a hydraulic transmission, wherein a plurality of variable pitch impeller blades will be effective to control the rate of flow of the hydraulic fluid used, and consequently the speed of rotation of a driven shaft, and wherein depression of a conventional brake pedal within the vehicle is utilized to return said blades to a neutral position so as to permit the vehicle to be halted with ease.

Other objects will appear from the following description, the claims appended thereto, and from the annexed drawings wherein like reference characters designate like parts throughout the several views, and in which:

Figure 1 is a longitudinal sectional view through a hydraulic transmission formed in accordance with the present invention, in which some parts remain in elevation, an associated vehicle engine and steering column being shown fragmentarily;

Figure 2 is a longitudinal sectional view taken on line 2—2 of Figure 1;

Figure 3 is a transverse sectional view taken substantially on line 3—3 of Figure 1;

Figure 4 is a sectional view through a pump embodied in the construction, taken substantially on line 4—4 of Figure 2;

Figure 5 is an enlarged transverse sectional view through the impeller blade mechanism, portions being broken away; and Figure 6 is a longitudinal sectional view through a modified form of hydraulic transmission.

Referring to the drawings in detail, the reference numeral 10 designates the engine of an automobile or other vehicle. The engine 10 is of thoroughly conventional construction, and powers the crank shaft 12, which extends rearwardly from the engine through a flywheel housing 14.

The crank shaft 12 extends longitudinally and centrally of a control linkage casing 16, which is formed open at opposite ends, and is secured at one end, by bolts 18, to the flywheel housing 14.

At its other end, the control linkage casing 16 is secured by bolts 20 to one end of a generally elongated fluid casing 22 arranged coaxially with the crank shaft and with the control linkage casing 16.

As may be noted from either Figure 1 or Figure 2, the fluid casing 22 is of hollow formation, and is progressively increased in diameter from its opposite ends to its intermediate portion.

At one end, the fluid casing 22 is formed with a center opening 24 providing a journal for the crank shaft 12, which extends into the casing 22. A gland or equivalent means is employed to prevent leakage from the fluid casing into the control linkage casing, at the location where the crank shaft enters the fluid casing.

The portion of the crank shaft that extends into the fluid casing 22, terminates intermediate opposite ends of said fluid casing, and is provided with a tapered nose 28 arranged coaxially with the crank shaft, and adapted to assure axial flow of the hydraulic fluid through the fluid casing 22.

Mounted upon the crank shaft 12 to rotate therewith, is a plurality of radial blades 30, the pitch of which can be controlled in a manner to be made presently apparent. It will be noted from Figures 3 and 5, that that portion of the crank shaft 12 on which the blades 30 are mounted is of polygonal cross sectional configuration, to provide a plurality of flat, angularly related faces each of which is coextensive in width with the width of an associated impeller blade 30 at the base of said blade.

Extending from the bases of the several blades 30 are spindles 34, rotatable in suitable radial openings formed in the crank shaft 12, and having at their inner ends pinions 36 which are secured by nuts 38 or equivalent fastening means to the spindles 34, for rotation with said spindles.

The pinions 36 are disposed within longitudinal grooves 40 formed within a pitch control shaft 26, that is slidable longitudinally of and within the hollow crank shaft 12. A longitudinal groove 40 is provided in the shaft 26 for each blade 30, and is formed, upon opposite walls thereof, with rack teeth 42 meshing with the pinion 36 of each blade.

It will thus be apparent that upon movement of the shaft 26 longitudinally of the crank shaft 12, the rack teeth 42, meshing with the pinions 36, will effect rotation of the spindles 34, so as to control the pitch of the impeller blades 30.

In the embodiment of the invention illustrated in Figures 1 to 5 inclusive, I provide means adapted to be manually controlled by the operator of the vehicle, whereby the pitch of the impeller blade is changed.

To this end, encircling the crank shaft 12 within the control linkage casing 16 is a collar 44, slidable longitudinally of the crank shaft. The collar 44 is peripherally grooved to receive a shifting collar or yoke 46, that is rigid with arms 48 extending along opposite sides of the crank shaft 12 and connected by a stirrup 50.

For the purpose of shifting the arms longitudinally of the crank shaft 12, and thus imparting corresponding longitudinal movement to the collar 44, I pivotally connect the arms 48 to the opposite ends of a yoke 52 straddling the crank shaft 12, and rigidly connected intermediate its ends with a lever 54. The lever 54 is fulcrumed intermediate its ends upon the wall of the control linkage casing 16, and projects above said casing, as may be readily noted from Figure 1.

At its other end, the lever 54 is pivotally connected to one end of a link 56 pivotally joined at its opposite end to one end of a medially fulcrumed bell crank 58, which in turn is pivotally joined to a link 60 having a pivotal connection to a crank 62 rigid with a rock shaft 64 rockably mounted upon the steering column 65 of the vehicle. A handle 66 is rigid with the rock shaft 64, and projects radially from said rock shaft within the vehicle. Thus, when the shaft 64 is rocked through the medium of the handle 66, movement will be given the collar 44 longitudinally of the crank shaft 12. Obviously, on movement of the handle 66 in one direction, the crank 62 will cause movement of the collar 44 in one direction, as for example, to the right in Figure 1. Upon movement of the handle 66 in an opposite direction, movement will be given the collar 44 in an opposite direction.

The brake pedal 68 of the vehicle is connected to the usual brake mechanism, not shown, of the vehicle, so as to apply the vehicle brake whenever depressed.

In addition, the brake pedal 68 is pivotally connected to one end of a link 70 that is pivotally joined at its opposite end as at 71 to one end of a crank arm 72, that is mounted pivotally upon the control linkage casing 16, and is rigid with the shaft 74 of a yoke having the depending yoke arms 76. The yoke arms 76, as may be noted from Figure 2, extend downwardly along opposite sides of the crank shaft 12, so as to be engageable with opposite faces of the collar 44. Depression of the brake lever 68 causes the link 70 to be moved forwardly, resulting in the crank arm 72 rotating the shaft 74 about its pivotal mounting in the casing 16.

Thus, regardless of the position to which the collar 44 may be shifted longitudinally of the crank shaft 12, depression of the brake pedal will be effective to return the collar to a neutral position.

The collar 44 is made rigid with the slidable pitch control shaft 26, through the provision of a cross pin 78, that extends through the collar and through said shaft. The opposite ends of the pin 78 project through diametrically opposite longitudinal slots 80 formed in the crank shaft 12. As a result, rotation of the crank shaft 12 is effective to rotate the shaft 26 and the collar 44 therewith. However, the collar 44 and the shaft 26 are nevertheless slidable longitudinally of the crank shaft 12.

As a result, operation of the handle 66 within the vehicle will cause the pitch of the impeller blades 30 to be changed as desired. This is so because the collar 44 will effect movement of the shaft 26 longitudinally of and within the crank shaft 12, and movement of the shaft 26 in this manner will be effective to vary the pitch of the impeller blades 30.

By movement of the handle 66 in one direction, the impeller blades are adjusted so as to give reverse movement to fluid contained within the fluid casing 22. Upon movement of the handle 66 in an opposite direction, the pitch of the blades is moved past neutral in an opposite direction, so as to cause movement of the fluid in an opposite direction within the fluid casing.

When the brake pedal 68 is depressed, the impeller blades are adjusted to a neutral position, so as to prevent movement of the fluid within the fluid casing in either direction.

Formed upon the fluid casing 22 at opposite sides thereof, and disposed contiguous to one end of the casing, are divergingly related branch passages 82 arranged in communication with conduits 84. The conduits 84 extend along opposite sides of the fluid casing 22, and are connected at their other ends to pipe members 86 extending to and comprising a part of a pair of positive displacement pumps 88.

Connected to the other side of the pumps 88 are conduits 90 extending into converging relation and connected as at 92 to the other end of the fluid casing 22.

Considering the construction of the respective pumps 88, each of these includes a casing 94 which may be of sectional formation, and mounted for rotation in said casing is a rotor 96 (see Figure 4), having a plurality of radial slots 98 disposed ninety degrees apart in which slides 100 are slidable radially of the rotor. The rotor 96 is eccentrically disposed relative to its associated casing 94.

The slides 100 are continuously urged outwardly and radially of the rotor 96 by springs 102.

Inlet and outlet ports 103 and 103' respectively are provided in the rotor casing 94, at opposite sides thereof.

Rigid with the rotor are driven shafts 104, whereby power is applied to the traction wheels of the vehicle.

Considering the operation of the manually controlled embodiment of the invention illustrated in Figures 1 through 5, the means whereby the pitch of the impeller blades is varied has been described hereinbefore. However, it may be noted that assuming that forward movement of the vehicle is desired, the hand lever 66 is operated in one direction, causing the pitch of the impeller blades to be set at an angle which will result in slow movement of fluid through the fluid casing 22, in one direction longitudinally of the casing. The fluid, for example, may move from right to left in Figure 2, and will flow into the conduits 90, to the respective pumps 88.

The pumps 88, though of the type which normally is used to cause fluid flow, are used in the present invention in an arrangement wherein they are rotated by the flow of fluid thereby. The fluid, flowing through the conduits 90 to the pipe members 86, operates the pumps, and causes rotation of the driven shafts. Obviously, the speed of flow of the fluid through the pumps will control the speed of rotation of the driven shafts 104.

The fluid, after leaving the pumps, will flow through the fluid conduits 84, and then back into the casing 22.

As higher speeds are desired, the handle 66 is operated, causing the pitch of the impeller blades to be changed and effecting a more rapid rate of flow of the fluid through the pumps 88.

It will thus be seen that instead of the normal three forward speeds allowed by standard transmissions, any gear ratio from "stop" through "overdrive" can be obtained with the present invention. Further, it may be noted that very low speeds are permitted, without "lugging" the engine, and additionally, smoother acceleration and the elimination of jerky starts are also obtained.

Whenever the brake pedal 68 is applied, the control disk 44 will be shifted to a neutral position, and the impeller blades 30 will be correspondingly adjusted to a neutral or "zero" position. In this position the impeller blades fit closely together, allowing only a very small amount of hydraulic fluid to flow thereby, and as a result, a braking action is set up within the pumps 88, since the cessation of flow of fluid through the pumps will act to slow or brake the rotors 96 of the pumps.

Obviously, reverse movement of the vehicle is permitted by adjusting the handle 66 in another direction, so as to reverse the flow of fluid through the fluid casing and through the pumps 88. In this connection, application of pressure to the brake pedal 68 will cause the impeller blades to be shifted to a neutral position, whether the fluid flow is giving reverse or forward movement to the vehicle.

Referring now to Figure 6, there is here illustrated a modified form of the invention, whereby the transmission becomes an automatic transmission. In this form of the invention, a hollow crank shaft 12 and pitch control shaft 26 slidably longitudinally thereof are provided, as in the first form of the invention. There is also provided the pitch control disk or collar 44, and the means described previously for shifting said collar longitudinally of the crank shaft 12 responsive to application of pressure to a brake pedal 68, or movement of an operating handle 66.

However, in accordance with the present invention, in the modified form illustrated in Figure 6 there is also provided a spring 106, held under compression between disks 108, 110 disposed within the hollow crank shaft 12. The disk 108 abuts against the inner end of the shaft 26, while the disk 110 abuts against a cross member 114 extending through the crank shaft 12, and rigid with a slidable collar 112. The collar 112 is slidable longitudinally of the crank shaft 12, but is secured to the crank shaft for rotation therewith by means of the cross member 114, which projects through diametrically opposed longitudinal slots formed in the crank shaft.

The collar 112 is peripherally grooved, to receive a control yoke 116.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a hydraulic transmission, the combination, with a depressible foot pedal, of a casing proportioned to contain a quantity of fluid; a hollow crank shaft extending into the casing and arranged longitudinally and centrally thereof, said crank shaft being operatively linked to a source of motive power for rotation thereby; a pitch control shaft mounted in the crankshaft to slide longitudinally thereof; impeller blades pivotally carried by said hollow crankshaft and circumferentially spaced thereabout, each of said blades having an axis of rotation normal to the axis of said hollow crankshaft and extending to the side wall of the casing so as to impart flow to fluid longitudinally of the casing responsive to rotation of the crank shaft; a plurality of series of rack teeth spaced circumferentially of and extending longitudinally of the pitch control shaft; pinions on the respective blades meshing with the teeth of the several series for changing the pitch of the blades responsive to movement of the pitch control shaft longitudinally of the crank shaft; and means effective to adjust the pitch control shaft longitudinally of the crank shaft to change the pitch of the blades and thus control the rate of flow of the fluid through the casing, said means including a housing secured to one end of the casing, a collar connected to the pitch control shaft within the housing to slide therewith longitudinally of the crank shaft, and a linkage for shifting the collar longitudinally of the crank shaft under the control of an operator; means for adjusting the blades to a flow-preventing position responsive to pressure applied to said pedal, said last named means including a yoke rotatably mounted in the housing and having a pair of arms straddling the crank shaft and disposed at opposite sides of the collar to shift the collar to a neutral position responsive to rotation of the yoke, said last named means further including an operative linkage extending between the pedal and yoke and effective to convert movement of the pedal to a depressed position to rotatable movement of the yoke.

2. In a hydraulic transmission, a casing proportioned to contain a quantity of fluid; a hollow crank shaft extending into the casing and arranged longitudinally and centrally thereof, said crank shaft being operatively linked to a source of motive power for rotation thereby; a pitch control shaft mounted in the crank shaft to slide longitudinally thereof; impeller blades pivotally carried by said hollow crankshaft and circumferentially spaced thereabout, each of said blades having an axis of rotation normal to the axis of said hollow crankshaft and extending to the side wall of the casing so as to impart flow to fluid longitudinally of the casing responsive to rotation of the crank shaft; a plurality of series of rack teeth spaced circumferentially of and extending longitudinally of the pitch control shaft; pinions on the respective blades meshing with the teeth of the respective series for changing the pitch of the blades responsive to movement of the pitch control shaft longitudinally of the crank shaft; and means effective to adjust the pitch control shaft longitudinally of the crank shaft to change the pitch of the blades and thus control the rate of flow of fluid through the casing, said means including a collar connected to the pitch control shaft to slide therewith longitudinally of the crank shaft under the control of an operator, and a spring held under compression between an end of a second collar carried by said crankshaft and one end of the pitch control shaft and normally urging the pitch control shaft in one direction to a selected flow-controlling position, said spring being secured at its opposite ends to the pitch control shaft and said second collar, respectively, for joint movement of the spring, pitch control shaft, and first named collar as a unit by the operator to predetermine said flow-controlling position.

3. A hydraulic transmission for vehicles comprising: a casing adapted to contain a quantity of fluid; a drive shaft extending into the casing and operatively linked to a source of motive power for rotation thereby; impeller blades pivotally carried by said drive shaft and circumferentially spaced thereabout, each of said blades having an axis of rotation normal to the axis of said drive shaft for imparting flow to said fluid responsive to rotation of the drive shaft; manually controlled means operatively connected to said blades and shiftable longitudinally of the shaft between opposite extreme positions for changing the pitch of the blades to control the direction and rate of flow of said fluid; and foot controlled means including a depressible foot pedal and a motion-translating linkage extending from said pedal to said manually controlled means, said linkage being arranged to shift the manually controlled means to a neutral location between the opposite extreme positions thereof, in which neutral location the blades are in a flow-preventing relation to said fluid.

4. A hydraulic transmission for vehicles comprising: a casing adapted to contain a quantity of fluid; a drive shaft extending into the casing and operatively linked to a source of motive power for rotation thereby; impeller blades pivotally carried by said drive shaft and circumferentially spaced thereabout, each of said blades having an axis of rotation normal to the axis of said drive shaft for imparting flow to said fluid responsive to rotation of the drive shaft; a collar circumposed about and sliding longitudinally of the drive shaft; a rack-and-pinion connection between the collar and blades adapted to regulate the blade pitch responsive to sliding movement of the collar; a hand operated linkage extending to the collar for imparting said sliding movement thereto; and foot controlled means including a depressible foot pedal and a motion-translating linkage extending from said pedal to said collar, said last-named linkage including a yoke swivelled on the casing and straddling the collar in engagement with the opposite faces thereof, to shift the collar to a neutral location between the opposite extreme positions thereof, in which neutral location the blades are in a flow-preventing relationship to said fluid.

References Cited in the file of this patent

UNITED STATES PATENTS

| Number | Name | Date |
| --- | --- | --- |
| 1,150,478 | Zagora | Aug. 17, 1915 |
| 1,190,139 | Ford | July 4, 1916 |
| 1,377,400 | Coppus | May 10, 1921 |
| 2,258,464 | Moody | Oct. 7, 1941 |
| 2,357,654 | Horton | Sept. 5, 1944 |
| 2,379,839 | Stepanoff | July 3, 1945 |
| 2,422,901 | Hunter | June 24, 1947 |
| 2,533,148 | Spiegel | Dec. 5, 1950 |

FOREIGN PATENTS

| Number | Country | Date |
| --- | --- | --- |
| 510,456 | Great Britain | Aug. 2, 1939 |